(12) United States Patent
Arai et al.

(10) Patent No.: US 6,265,721 B1
(45) Date of Patent: Jul. 24, 2001

(54) ENERGY-DISPERSIVE-TYPE SEMICONDUCTOR X-RAY DETECTOR

(75) Inventors: Shigetoshi Arai; Shinya Sasaki, both of Miyanohigashi-machi (JP)

(73) Assignee: Horiba, Ltd., Kyoto (JP)

( * ) Notice: Subject to any disclaimer, the term of this patent is extended or adjusted under 35 U.S.C. 154(b) by 0 days.

(21) Appl. No.: 09/075,080

(22) Filed: May 8, 1998

(30) Foreign Application Priority Data

May 10, 1997 (JP) .................................... 9-136190

(51) Int. Cl.[7] .................................................. G01T 1/00
(52) U.S. Cl. ........................... 250/370.15; 250/352
(58) Field of Search ............... 250/370.15, 352; 62/51.1

(56) References Cited

U.S. PATENT DOCUMENTS 5,552,608 * 9/1996 Gallagher et al. .............. 250/370.15

FOREIGN PATENT DOCUMENTS 0277304  8/1988  (EP) .
6109339  4/1994  (JP) .

* cited by examiner

Primary Examiner—Georgia Epps
Assistant Examiner—Richard Hanig
(74) Attorney, Agent, or Firm—Price & Gess

(57) ABSTRACT

This invention provides an EDS detector in which even if connecting pipes vibrate due to gas flow, such vibration will not be transferred to a cryostat side and in which a small-sized gas-circulation-type refrigerator is provided in the cryostat sliding in a given direction, helium gas is supplied through the connecting pipes to the refrigerator, and an x-ray detecting element is cooled by means of the refrigerator. In connecting pipes, a connecting pipe body portion is connected to a pressure-converting value unit which is fixedly held in a vibration-proofing stand. Additionally, weights can be selectively applied to a flexible connecting pipe to further dampen vibrations.

11 Claims, 4 Drawing Sheets

ENERGY-DISPERSIVE-TYPE SEMICONDUCTOR X-RAY DETECTOR

BACKGROUND OF THE INVENTION

1. Field of the Invention

The present invention relates to an energy-dispersive-type semiconductor x-ray detector (hereinafter called the EDS detector) used for energy-dispersive-type element analyzers, for example, such as x-ray microanalyzers which are combined with an electron microscope and measure characteristic x-rays excited with an electron beam and emitted from a specimen, and fluorescence x-ray analyzers using x-ray excitation, and more particularly to an EDS detector in which a small-sized gas-circulation-type refrigerator is provided in a cryostat sliding in a given direction, helium gas is supplied through a connecting pipe to the refrigerator, and an x-ray detecting element is cooled by means of the refrigerator.

2. Description of Related Art

Although heretofore, as an EDS detector used for energy-dispersive-type element analyzers requiring a high resolution, lithium-drift-type silicon semiconductor x-ray detectors (silicon lithium detectors) have been widely used, the silicon (lithium) detectors have a problem in that when a drifted lithium ion moves into silicon due to thermal diffusion, the characteristics of the x-ray detecting element deteriorates, so that the element must be cooled by the use of liquid nitrogen at all times and liquid nitrogen replenished, thereby making daily maintenance troublesome.

On the other hand, as an alternative to the above-mentioned liquid nitrogen system, a small-sized gas-circulation-type refrigerator such as of a Joule-Thomson system and of pulse tube system has been developed. The small-sized gas-circulation-type refrigerator has a sufficient refrigerating capacity, has no mechanically driving part in the low-temperature generating section, and is simple in construction, so that the refrigerator is characterized by an extremely low vibration, a high reliability with respect to long-time operation, and an easy maintenance. There has been attempts to provide a small-sized gas-circulation-type refrigerator in a cryostat sliding in a given direction, to supply helium gas through a connecting pipe to the above-mentioned refrigerator, and to cool an x-ray detecting element by means of the above-mentioned refrigerator.

FIG. 4 shows schematically the configuration of a prior art EDS detector 40, in which numeral 41 designates a cryostat configured so as to be slid on a guide base 42 in the arrow F or R direction. Provided in the cryostat 41 is a pulse tube refrigerator 43, which includes a cold heat exchanger portion 43b and a refrigerator body 43a which is connected to a cold finger 44 extending in the horizontal direction. Provided on the head of the cold finger 44 is an x-ray detecting element 45. Numeral 46 designates an x-ray window provided in front of the x-ray detecting element 45.

The refrigerator body 43a of the above-mentioned pulse tube refrigerator 43 is connected through a connecting pipe 47 to a pressure converting valve unit 48, which, in turn, is connected through a high-pressure helium piping 49 and a low-pressure helium piping 50 to a compressor 51. Numeral 47a is a flexible pipe portion of the connecting pipe 47 connected to the refrigerator body 43a.

In the EDS detector 40 having the above-mentioned configuration, the high-pressure and low-pressure helium gases adjusted by the compressor 51 are supplied to the pressure changeover valve unit 48, and the pressure wave of the above-mentioned helium gas is supplied through the connecting pipe 47 to the refrigerator body 43b of the pulse tube refrigerator 43, whereby the refrigerator body 43a is acceleratedly cooled, and due to the cold generated, the cold finger 44 is cooled and thus the x-ray detecting element 45 is cooled.

However, in this case, the above-mentioned connecting pipe 47 may vibrate due to the pressure wave of the helium gas therein, so that the vibration is transferred to the cryostat 41 housing the x-ray detecting element 45, whereby the x-ray detecting element 45 may be vibrated or an electron microscope to which the EDS detector 40 is mounted may be vibrated, which can adversely affect the accuracy in measurement and in x-ray detection.

Accordingly, the prior art is still seeking improvements in this field.

OBJECTS AND SUMMARY OF THE INVENTION

The present invention is made in view of the above-mentioned matters, and it is an object of the invention to provide an EDS detector in which even if connecting pipes may vibrate due to gas flow, such vibration will not be transferred to a cryostat side.

In order to achieve the above-mentioned object, the present invention provides an energy-dispersive-type semiconductor x-ray detector in which a small-sized gas-circulation-type refrigerator is provided in the cryostat sliding in a given direction, helium gas is supplied through the connecting pipes to the refrigerator, and an x-ray detecting element is cooled by means of the refrigerator, and in which of the above-mentioned connecting pipes, a connecting pipe body portion connected to a pressure converting value unit is allowed to contact a vibration-proofing stand and to be fixedly held therewith.

In the EDS detector of the present invention, the connecting pipe is fixed with the vibration-proofing stand mechanism to suppress the vibration of the connecting pipe. Accordingly, a phenomenon is eliminated wherein vibration is transferred to the cryostat housing an x-ray detecting element. Further, when a weight or weights are provided on a flexible portion at the head of the connecting pipe, the vibration of the connecting pipe can be more positively prevented.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art since the general principles of the present invention have been defined herein specifically to provide an improved EDS detector with vibration-dampening features.

Figure 1:
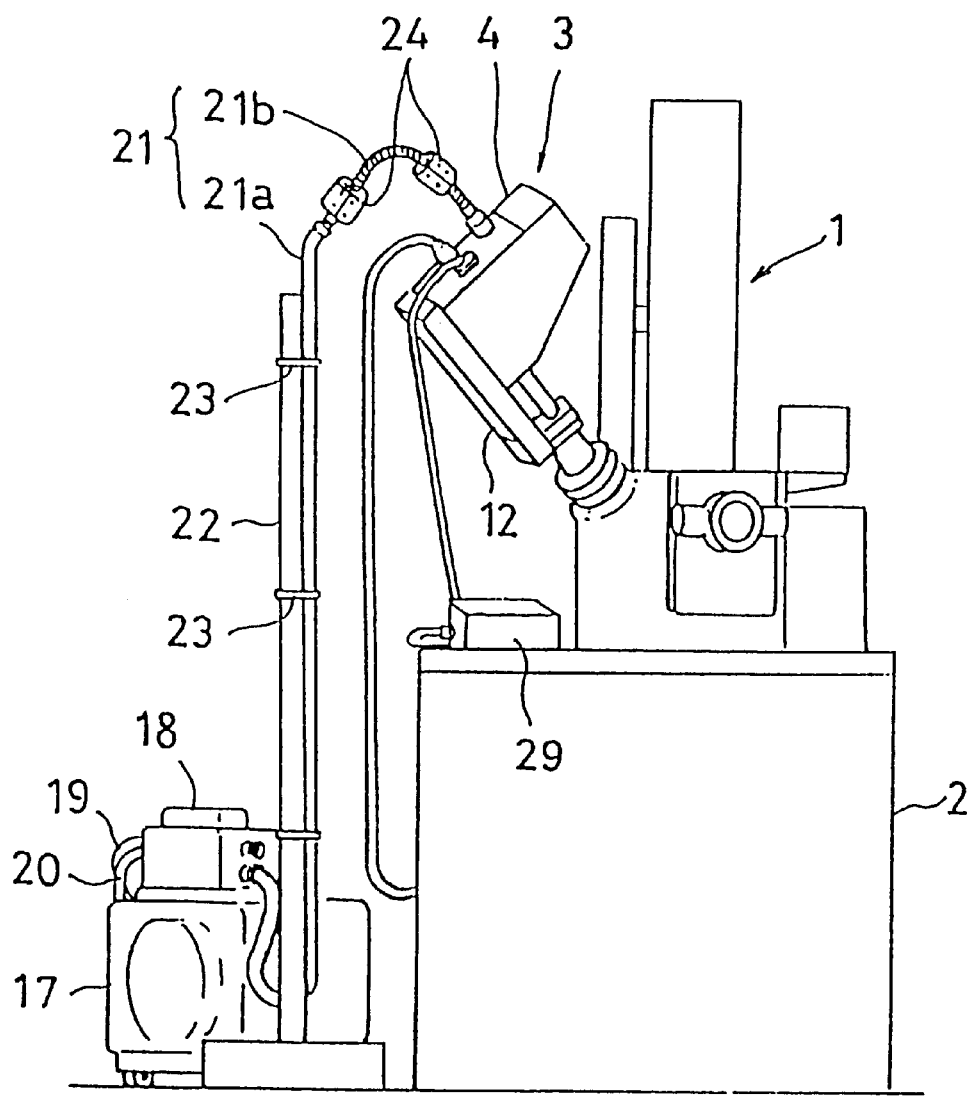
FIG. 1 is a view showing an example of an energy-dispersive-type element analyzer into which the above-mentioned EDS detector is incorporated.
Figure 2:
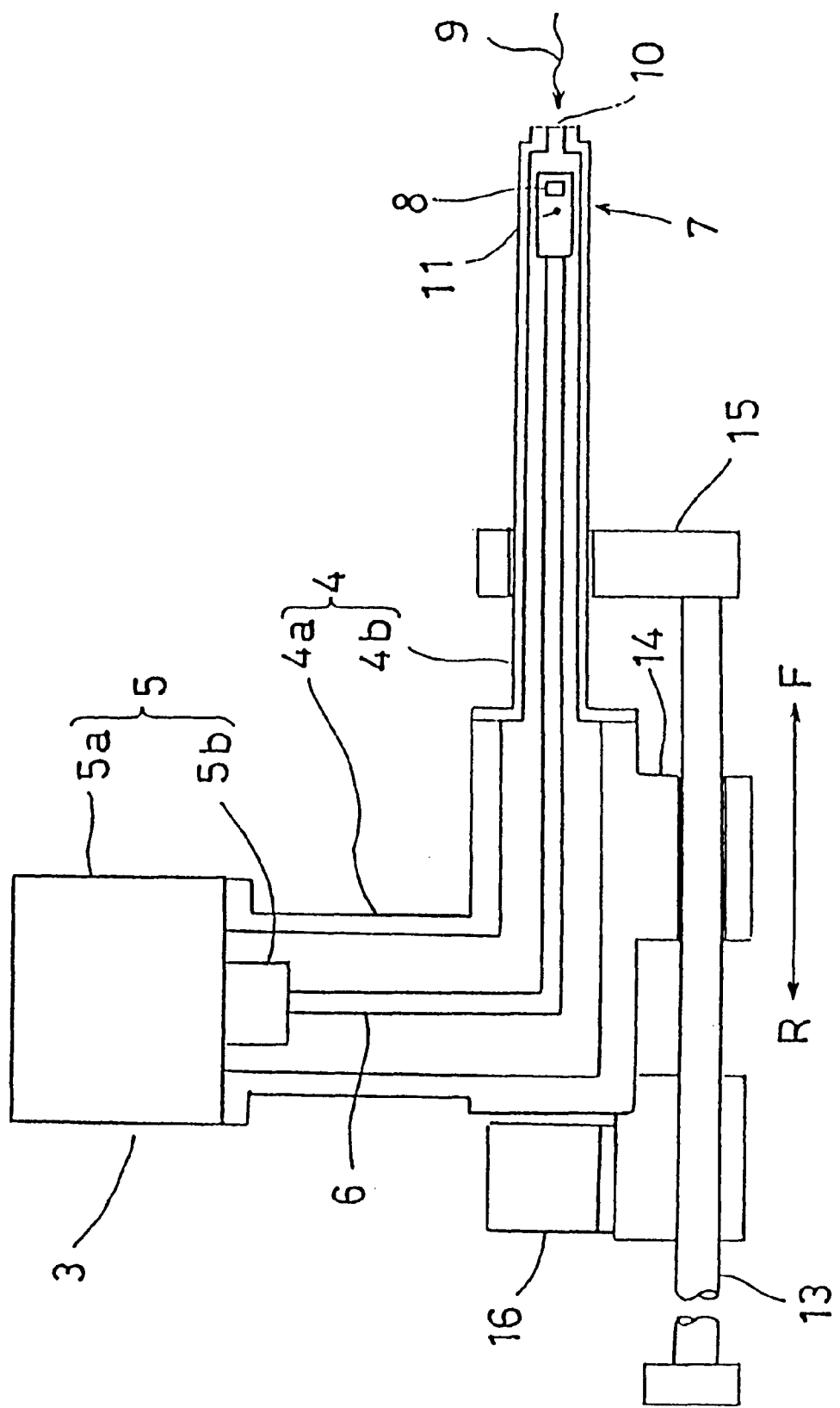
FIG. 2 is a sectional view showing schematically the configuration of principal parts of the above-mentioned EDS detector.
Figure 3:
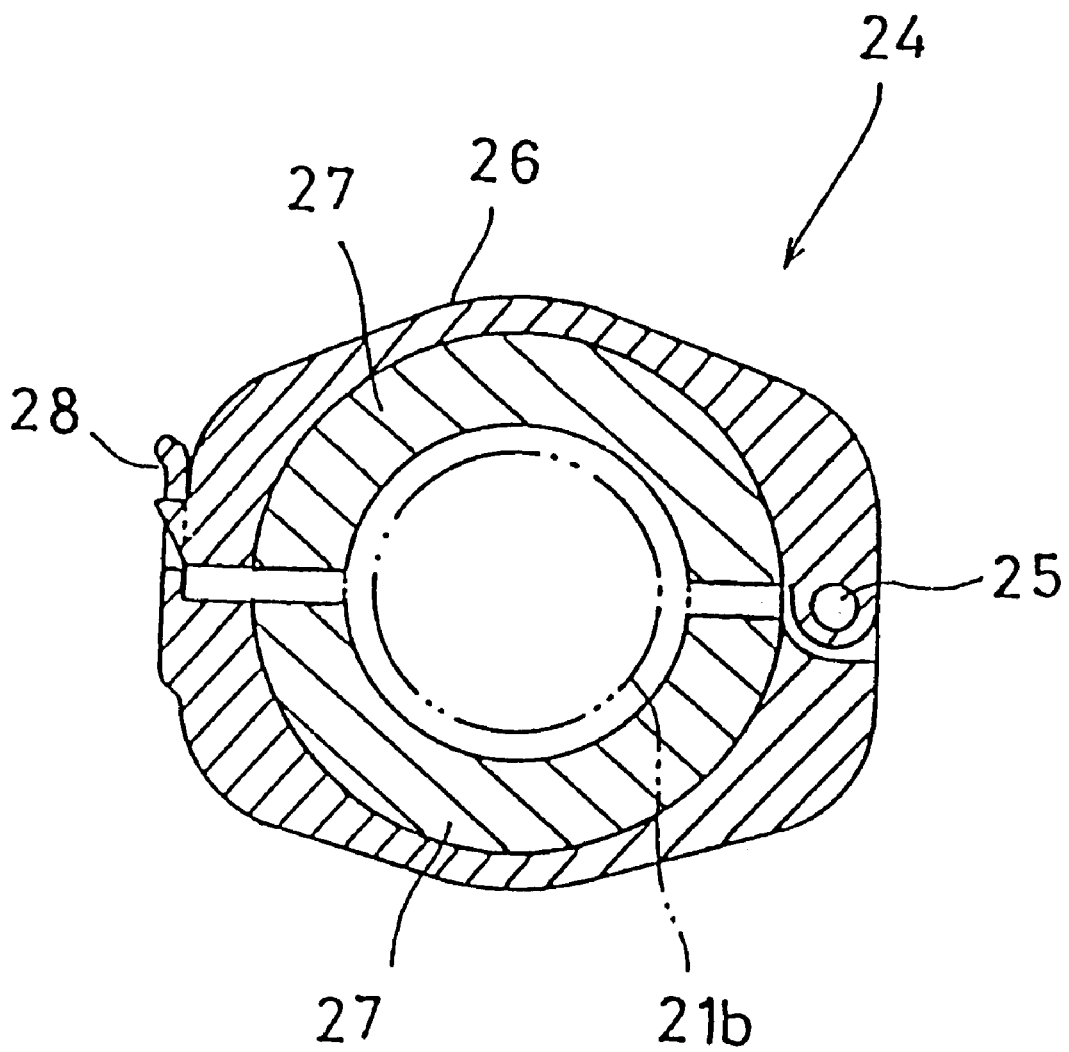
FIG. 3 is a sectional view showing an example of a vibration-proofing weight.
Figure 4:
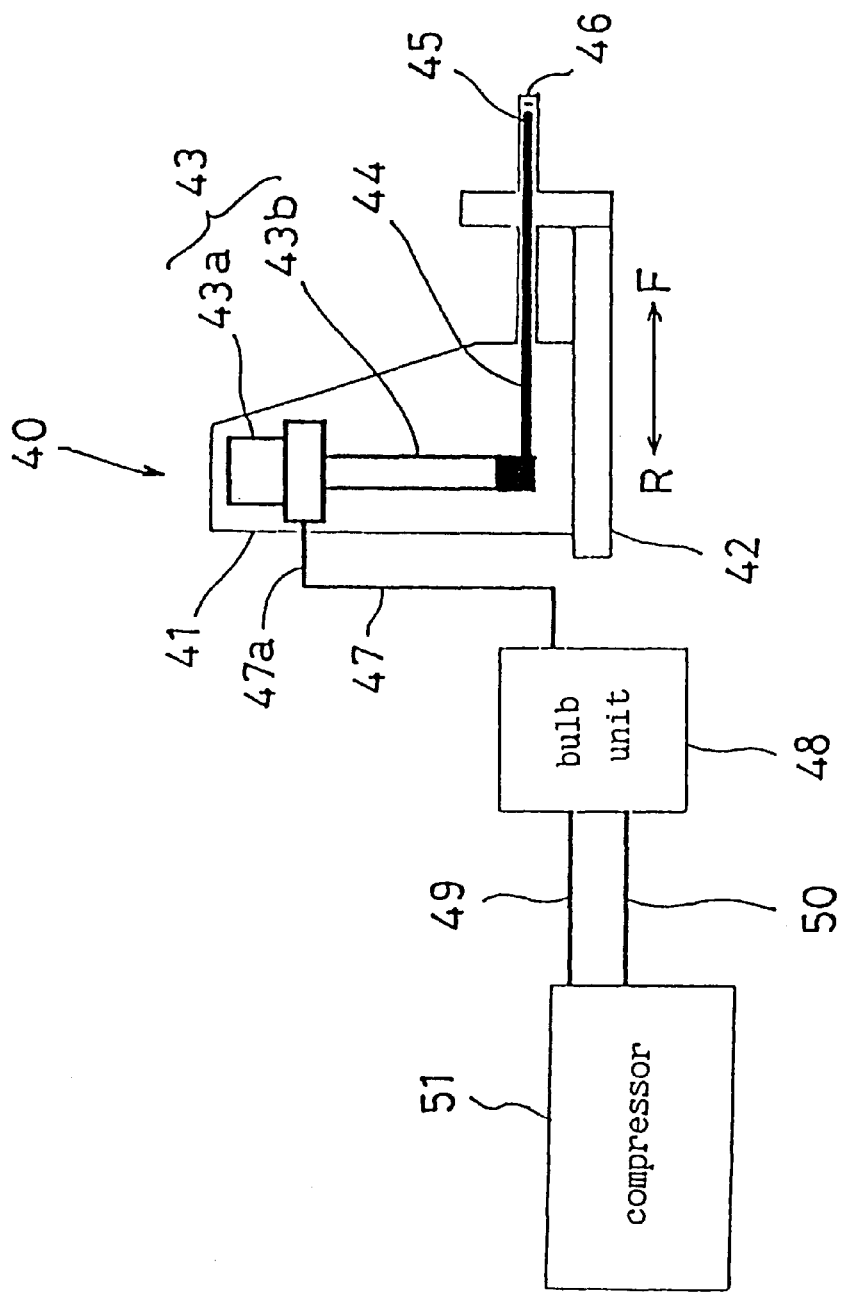
FIG. 4 is a view showing schematically a prior art EDS detector.

With reference to the drawings, embodiments of the present invention will be explained. FIGS. 1–3 show one embodiment of the present invention. First, FIG. 1 shows an example of an energy-dispersive-type element analyzer into which the EDS detector of the present invention is incorporated, in which numeral 1 designates, for example, a scanning electron microscope placed on a holding base 2 for housing a power unit and the like. Numeral 3 designates the EDS detector mounted slidably on the electron microscope body 1.

Explaining the schematic configuration of the above-mentioned EDS detector with reference to FIG. 2, numeral 4 designates a cryostat which consists of an L-shaped body portion 4a and a horizontal, tubular portion 4b connecting thereto, and whose internal portion is isolated from outside air and is kept at a vacuum. Numeral 5 designates a pulse tube refrigerator which is a kind of small-sized gas-circulation-type refrigerator, provided on the top portion inside the body portion 4a of the cryostat 4, and whose cold heat portion or heat exchanger 5b is extendedly provided from a refrigerator body 5a thereof into the cryostat 4. The helium gas supply structure to this pulse tube refrigerator 5 will be explained later.

Numeral 6 designates a cold finger which is provided in the space between the body portion 4a and the horizontal, tubular portion 4b connecting thereto, and which is made of a material with a good thermal conductivity such as copper, and formed into, for example, an L-shape, and whose one end is coupled thermally to the cold heat exchange portion 5b of the pulse tube refrigerator 5.

Numeral 7 designates an x-ray detecting element portion which is provided in a thermally coupled relationship to the head of the cold finger 6. Numeral 8 designates an x-ray detecting element which is a main component member of the x-ray detecting element portion 7 and in front of which an x-ray window 10 for permitting the penetration of an x-ray 9 is formed. Numeral 11 designates a temperature sensor for sensing a temperature of the x-ray detecting element 8.

The above-mentioned x-ray detecting element 8 consists of, for example, a high-purity N-type silicon wafer which is 2–5 mm in thickness and 30 kΩ·cm in resistivity. The use of such a high-purity silicon wafer produces a detecting element having an intrinsic region with a sufficient thickness even without drifting lithium. Even if the pulse tube refrigerator 5 fails to operate due to power failure and the like, whereby the x-ray detecting element 8 consisting of a high-purity silicon wafer cannot be cooled by the refrigerator 5 and reaches a higher temperature in the vacuum, the x-ray detecting element 8 will not deteriorate in characteristics, so that a backup power source such as a battery to drive the refrigerator is not required to be provided.

The detailed configuration of the above-mentioned x-ray detecting element portion 7 is explained in detail in "Energy-Dispersive-Type Semiconductor X-Ray Detector" disclosed in Japanese patent application No. HEI 9-70438 in connection with the applicant of the present invention.

The above-mentioned EDS detector 3 is configured such that the whole of the detector 3 is slid in the arrow F direction (forward moving direction) or in the arrow R direction (rearward moving direction) as shown in FIG. 2 in a manner to move the above-mentioned x-ray detecting element portion 7 close to or away from a specimen stage (not shown) within the electron microscope 1. That is, in FIG. 1, numeral 12 designates a guide base extendedly provided toward the electron microscope 1, in which, in the guide base, a guide rod 13 is provided as shown in FIG. 2. The guide rod 13 in turn is provided with a guided portion 14 on the bottom of the cryostat 4 in a manner to be guided by the guide rod 13. Numeral 15 designates a guide portion for being inserted with the horizontal, tubular portion 4b of the cryostat 4 to guide. Numeral 16 designates a linear driving actuator.

Now explaining the supply structure of helium gas to the pulse tube refrigerator 5 with reference to FIG. 1, numeral 17 designates a compressor, numeral 18 designates a pressure converting valve unit, and both of these elements 17 and 18 are connected through a high-pressure helium piping 19 and a low-pressure helium piping 20 to each other.

Numeral 21 designates a connecting pipe which connects between the pressure converting valve unit 18 and the cryostat 4, and supplies a helium gas adjusted to a given pressure to the refrigerator body 5a within the cryostat 4, and which consists of a rigid body portion 21a connected with the pressure converting valve unit 18 and a flexible portion 21b connected to the head of body portion 21a and also connected with the refrigerator body 5a. It will be appreciated that the head flexible portion 21b is configured to cope with the movement of the cryostat 4 in the arrow F direction or arrow R direction in FIG. 2. The above-mentioned connecting pipe body portion 21a touches with a vibration-proofing stand 22 erectly provided near the holding base 2 and is fixedly held with a suitable fixing member 23. The stand 22 includes a solid vertical support post extending upward from a heavily weighted base member. The pipe 21a can be affixed by coupler 23 at a plurality of spaced locations along the support base to dampen any vibrations. The connecting pipe flexible portion 21b is further mounted with weights 24 to suppress the remaining vibrations thereof, for example, two weights as shown at spaced locations on the flexible portion 21b.

That is, the above-mentioned weights 24, as shown in FIG. 3, consist of circular arc-shaped halves of a weight body 27 which is made of lead or the like enclosed in a plastic case 26 having a hinge 25, and has an inside diameter slightly larger than the outside diameter of the connecting pipe flexible portion 21b. Numeral 28 designates a lock mechanism such as a slot and cam tooth which keeps the plastic case 26 in a closed condition, and is configured such that the locked condition can be released by the operation of fingers or the like.

In FIG. 1, numeral 29 designates a controller which controls the cooling and forward or rearward movement of the EDS detector 3 (the x-ray detecting element 8) and is placed on the upper face of the holding base 2.

In the EDS detector 3 configured as described above, the body portion 21a of the connecting pipe 21 for supplying a pressure adjusted helium gas to the refrigerator body 5a of the pulse tube refrigerator 5 within the cryostat 4 touches with the vibration proofing stand 22 and is fixed therewith, and at the same time, the head flexible portion 21b is provided with the vibration-proofing weight 24, so that the vibration of the connecting pipe 21 can be suppressed. Therefore, even if the pressure adjusted helium gas flows in the connecting pipe 21, the vibration of the connecting pipe 21 will be eliminated and no vibration will be transferred to the cryostat 4 housing the x-ray detecting element 8. As a result, the vibration of the x-ray detecting element 8 or the electron microscope 1 is eliminated, so that a specified x-ray detection can be performed and a measurement with a high precision be conducted.

The present invention is not limited to the above-mentioned embodiment, and can be modified into various forms and, for example, instead of the pulse tube refrigerator 5, a small-sized gas-circulation-type refrigerator of another system such as the Joule-Thomson system may be used.

Also, the x-ray detecting element 8 may be configured by a prior art silicon (lithium) element. In this case, the silicon (lithium) element deteriorates in performance at room temperature when the degree of vacuum of the cryostat 4 becomes lost, so that it is necessary to evacuate by an ion pump at all times or periodically by a vacuum pump (not shown) of the electron microscope 1.

The connecting pipe 21 may be sufficient when the head portion 21b is flexible, or when the body portion 21a is formed of a material having a rigidity. Further, the vibration-proofing weight 24 may be sufficient with a shape other than mentioned above when the shape is such that the weight 24 can be removably mounted to the connecting pipe flexible portion 21b, and the weight and the number of weights mounted may be arbitrarily selected.

In the EDS detector of the present invention, of the connecting pipes for supplying helium gas to the small-sized gas-circulation-type refrigerator to cool the x-ray detecting element, the connecting pipe body portion connected to the pressure converting valve unit is allowed to touch with the vibration-proofing stand and to be fixedly held therewith, so that the vibration of the connecting pipe can be effectively prevented and thus vibration is not transferred to the EDS detector. Therefore, a detection with a high precision can be performed.

Further, where a weight is mounted to the connecting pipe flexible portion connected to the cryostat to suppress the vibration, the vibration of connecting pipe can be more positively preventive.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. In an x-ray detector having a gas-driven refrigeration system for maintaining the x-ray detector at a low temperature and connected to a source of pulsed gas, the improvement comprising:
   a connecting conduit line of gas from the source of gas to the gas-driven refrigeration system including a first portion of the conduit line and a second portion of the conduit line, the second portion of the conduit line is flexible to accommodate movement of the x-ray detector to a position adjacent a sample;
   a support member for rigidly holding the first portion of the conduit line in a fixed position; and
   a vibration-dampening member connected to the second portion of the conduit line to dampen vibration caused by the pulsed gas.

2. The invention of claim 1 wherein the support member is a stand having a weighted base and a vertical support post attached to the weighted base and to the first portion of the conduit line.

3. The invention of claim 1 wherein the vibration-dampening member is a removable weight member that is clamped onto the second portion of the conduit line.

4. The invention of claim 3 wherein the weight member includes a pair of semi-circular halves of a weight body enclosed in a plastic case with a hinge and a lock mechanism.

5. In an energy-dispersive-type semiconductor x-ray detector in which a small-sized gas-circulation-type refrigerator is provided in a cryostat sliding in a given direction, helium gas is supplied through a connecting pipe to the refrigerator, and an x-ray detecting element is cooled by means of the refrigerator, the improvement comprising:
   a vibration-dampening stand member having a weighted base and a vertical support post extending upward from the base and fixedly attached to a portion of the connecting pipe, wherein the connecting pipe includes a flexible portion to enable movement of the x-ray detecting element and a removable weight member is attached on the flexible portion to dampen any vibration of the flexible portion.

6. The invention of claim 5 wherein the removable weight member includes a pair of semi-circular halves of a weight body enclosed in a plastic case with a hinge and a lock mechanism.

7. In an energy-impressive-type semiconductor x-ray detector in which a small-sized gas-circulation-type refrigerator is provided in a cryostat sliding in a given direction, helium gas is supplied from a pressure-converting valve unit through a connecting pipe having a flexible portion to accommodate movement of the cryostat to the refrigerator, and an x-ray detecting element is cooled by means of the refrigerator, the improvement comprising:
   a vibration-dampening stand member having a weighted base and a vertical support post fixedly connected to the connecting pipe to permit movement of the flexible portion; and
   a removable weight member freely attached to and supported at an intermediate position of the flexible portion to dampen vibrations caused by the helium gas released by the pressure-converting valve unit.

8. The invention of claim 7 wherein the removable weight member includes a pair of semi-circular halves of a weight body enclosed in a plastic case with a hinge and a lock mechanism.

9. In an x-ray detector assembly having a gas-driven refrigeration system for maintaining a low temperature and connected to a source of pulsed gas, the improvement comprising:
   an energy-dispersive semiconductor x-ray detector of a high-purity N-type silicon wafer;
   a cryostat mounts the x-ray detector;
   a gas driven refrigerator is connected to the cryostat for providing heat exchange to the x-ray detector;
   a controller assembly is operatively connected to move the gas driven refrigerator and cryostat relative to a sample;
   a source of pulsed high pressure helium gas;
   a connecting conduit line of helium gas from the source of helium gas to the gas-driven refrigeration system including a first rigid portion of the conduit line and a second flexible portion of the conduit line to accommodate movement of the x-ray detector to a position adjacent the sample;
   a support member having a weighted base and a support post for rigidly holding the first rigid portion of the conduit line in a fixed position for dampening of vibration; and a vibration-dampening weight member connected to and supported by the second flexible portion of the conduit line to further dampen any vibration caused by the pulsed gas.

10. The invention of claim 9 wherein the vibration-dampening weight member is a removable weight member that is clamped onto the second flexible portion of the conduit line.

11. The invention of claim 10 wherein the weight member includes a pair of semi-circular halves of a weight body enclosed in a plastic case with a hinge and a lock mechanism.

* * * * *